US010633483B2

(12) United States Patent
Hasegawa et al.

(10) Patent No.: US 10,633,483 B2
(45) Date of Patent: Apr. 28, 2020

(54) FOAMING THERMOPLASTIC POLYURETHANE RESIN, PRODUCING METHOD THEREOF, AND MOLDED ARTICLE

(71) Applicant: MITSUI CHEMICALS, INC., Tokyo (JP)

(72) Inventors: Daisuke Hasegawa, Yokohama (JP); Masakazu Kageoka, Kawasaki (JP); Wataru Aoki, Ichihara (JP); Masumi Saruwatari, Suginami (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/099,383

(22) PCT Filed: Nov. 14, 2017

(86) PCT No.: PCT/JP2017/040836
§ 371 (c)(1),
(2) Date: Nov. 6, 2018

(87) PCT Pub. No.: WO2018/092744
PCT Pub. Date: May 24, 2018

(65) Prior Publication Data
US 2019/0211136 A1 Jul. 11, 2019

(30) Foreign Application Priority Data
Nov. 17, 2016 (JP) ................................ 2016-224421

(51) Int. Cl.

| | |
|---|---|
| *A43B 13/04* | (2006.01) |
| *A43B 13/12* | (2006.01) |
| *A43B 13/18* | (2006.01) |
| *A43B 13/42* | (2006.01) |
| *A43B 3/12* | (2006.01) |
| *B24B 37/00* | (2012.01) |
| *B29D 35/12* | (2010.01) |
| *C08G 18/08* | (2006.01) |
| *C08G 18/10* | (2006.01) |
| *C08G 18/22* | (2006.01) |
| *C08G 18/24* | (2006.01) |
| *C08G 18/32* | (2006.01) |
| *C08G 18/42* | (2006.01) |
| *C08G 18/48* | (2006.01) |
| *C08G 18/75* | (2006.01) |
| *C08J 9/12* | (2006.01) |
| *C08J 9/228* | (2006.01) |
| *C08L 75/04* | (2006.01) |
| *C08J 9/18* | (2006.01) |
| *C08G 101/00* | (2006.01) |

(52) U.S. Cl.
CPC ............ *C08G 18/752* (2013.01); *A43B 13/04* (2013.01); *B24B 37/00* (2013.01); *C08G 18/10* (2013.01); *C08G 18/227* (2013.01); *C08G 18/242* (2013.01); *C08G 18/3206* (2013.01); *C08G 18/4277* (2013.01); *C08G 18/4833* (2013.01); *C08G 18/4854* (2013.01); *C08G 18/753* (2013.01); *C08J 9/12* (2013.01); *C08J 9/18* (2013.01); *C08J 9/228* (2013.01); *C08G 2101/00* (2013.01); *C08G 2101/0066* (2013.01); *C08G 2350/00* (2013.01); *C08G 2410/00* (2013.01); *C08J 2201/03* (2013.01); *C08J 2203/08* (2013.01); *C08J 2375/06* (2013.01); *C08J 2375/08* (2013.01)

(58) Field of Classification Search
CPC .. C08G 18/10; C08G 18/3206; C08G 18/752; C08G 18/14; C08G 18/227; C08G 18/242; C08G 18/4277; C08G 18/4854; C08G 18/4833; C08G 2350/00; C08G 2410/00; C08J 9/228; C08J 2201/03; C08J 2203/08; C08L 75/04
See application file for complete search history.

(56) References Cited

U.S. PATENT DOCUMENTS 3,829,533 A * 8/1974 Nakabayashi et al. ...................... C08G 18/10 525/454
4,627,178 A 12/1986 Sullivan
6,376,567 B1 4/2002 Werner
7,232,859 B2 * 6/2007 Argyropoulos ........ C08G 18/12 428/423.1
9,475,903 B2 * 10/2016 Yamasaki ............. C07C 263/20
9,611,370 B2 * 4/2017 Nishiguchi ........ C08G 18/4837
2002/0193459 A1 12/2002 Haseyama et al.
2004/0087754 A1 * 5/2004 Foley .................. C08G 18/664 528/59
2008/0050995 A1 * 2/2008 Lai ...................... C09D 175/04 442/164

(Continued)

FOREIGN PATENT DOCUMENTS

EP 1664169 B1 5/2009
JP 2002535468 10/2002

(Continued)

OTHER PUBLICATIONS

International Search Report dated Feb. 20, 2018 issued in PCT/JP2017/040836.

(Continued)

*Primary Examiner* — Melissa A Rioja
(74) *Attorney, Agent, or Firm* — Rankin, Hill & Clark LLP

(57) ABSTRACT

A foaming thermoplastic polyurethane resin is a reaction product of a polyisocyanate component containing a bis (isocyanatomethyl)cyclohexane and a polyol component. In a peak of chromatogram obtained by measurement of the foaming thermoplastic polyurethane resin with gel permeation chromatography, the area of a high molecular weight component having a weight average molecular weight of 400,000 or more with respect to the total area of the peak is 25% or more and 60% or less.

10 Claims, 1 Drawing Sheet

(56) References Cited

U.S. PATENT DOCUMENTS

| | | | | |
|---|---|---|---|---|
| 2009/0075568 | A1* | 3/2009 | Kimura | B24B 37/26 451/59 |
| 2009/0082477 | A1 | 3/2009 | Speas | |
| 2010/0216905 | A1 | 8/2010 | Kuwamura et al. | |
| 2010/0222442 | A1 | 9/2010 | Prissok et al. | |
| 2012/0329892 | A1 | 12/2012 | Prissok et al. | |
| 2014/0374976 | A1 | 12/2014 | Yang | |

FOREIGN PATENT DOCUMENTS

| | | | |
|---|---|---|---|
| JP | 2006504843 | | 2/2006 |
| JP | 2007238958 | A2 | 9/2007 |
| JP | 2009149848 | A | 7/2009 |
| JP | 2011105812 | A2 | 6/2011 |
| JP | 2011518898 | | 6/2011 |
| JP | 2012046700 | A1 | 3/2012 |
| JP | 2013076076 | A | 4/2013 |
| KR | 20020045568 | A | 6/2002 |
| KR | 20130075413 | A | 7/2013 |
| WO | 2000044821 | A1 | 8/2000 |
| WO | 2004041899 | A1 | 5/2004 |
| WO | 2005026243 | A1 | 3/2005 |
| WO | 2007082838 | A1 | 7/2007 |
| WO | 2009051114 | A1 | 4/2009 |
| WO | 2009126673 | A1 | 10/2009 |
| WO | 2010038724 | A1 | 4/2010 |
| WO | 2015017088 | A1 | 2/2015 |
| WO | 2015017089 | A1 | 2/2015 |
| WO | 2015017090 | A1 | 2/2015 |
| WO | WO 2015046369 | A1 * | 4/2015 |

OTHER PUBLICATIONS

PCT International Preliminary Report on Patentability (Form PCT/IB/373) filed in PCT/JP2017/040836, with PCT Notification Concerning Transmittal of International Preliminary Report on Patentability (Form PCT/IB/326) dated May 31, 2019.

PCT International Preliminary Report on Patentability (Form PCT/IB/373) filed in PCT/JP2017/040836, with PCT Notification of Transmittal of Translation of the International Preliminary Report on Patentability (Form PCT/IB/338) dated May 31, 2019.

* cited by examiner

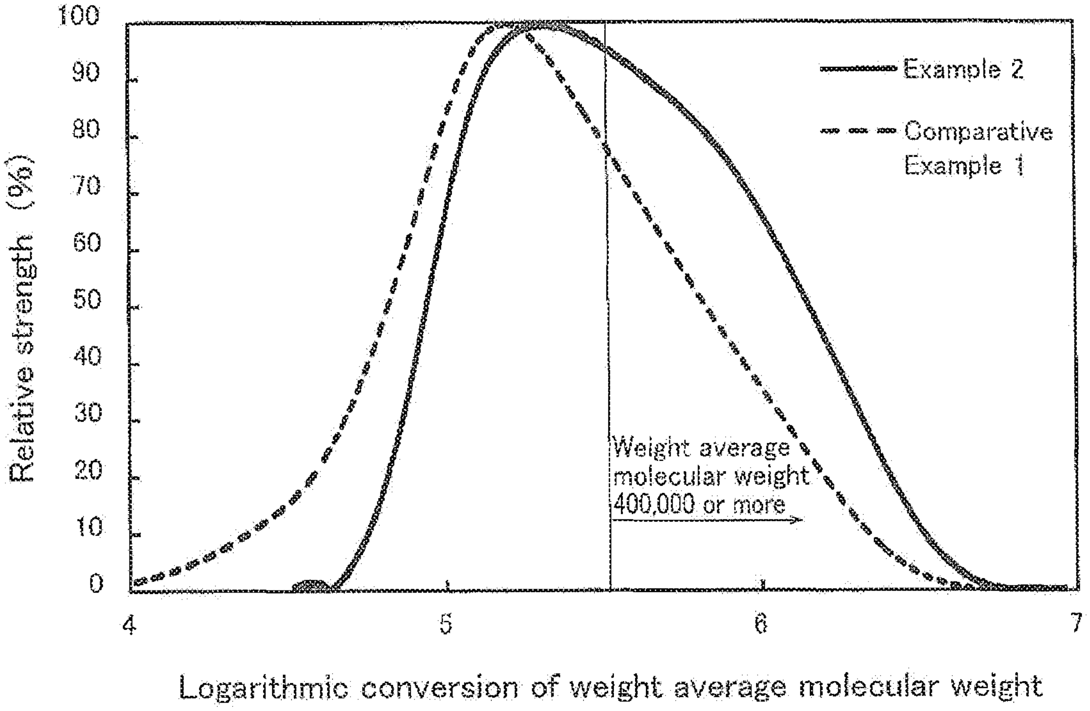
100
90
80
70
60
50
40
30
20
10
0
Relative strength (%)
4
5
6
7
Logarithmic conversion of weight average molecular weight
Example 2
Comparative Example 1
Weight average molecular weight 400,000 or more

FOAMING THERMOPLASTIC POLYURETHANE RESIN, PRODUCING METHOD THEREOF, AND MOLDED ARTICLE

TECHNICAL FIELD

The present invention relates to a foaming thermoplastic polyurethane resin, a method for producing a foaming thermoplastic polyurethane resin, and a molded article containing the foaming thermoplastic polyurethane resin.

BACKGROUND ART

A thermoplastic polyurethane resin (TPU) is generally a rubber elastic body obtained by reaction of a polyisocyanate, a high molecular weight polyol, and a low molecular weight polyol, and includes a hard segment formed by reaction of the polyisocyanate and the low molecular weight polyol and a soft segment formed by reaction of the polyisocyanate and the high molecular weight polyol.

It has been known that the thermoplastic polyurethane resin, along with a foaming agent, is melted and molded, so that a foaming molded article is obtained.

To be specific, for example, it has been proposed that a pellet of the thermoplastic polyurethane resin is produced from a 4,4'-diphenylmethane diisocyanate (MDI) as a polyisocyanate, a polyester polyol made of an adipic acid and a 1,4-butanediol as a high molecular weight polyol, and a 1,4-butanediol as a low molecular weight polyol, and the pellet, along with a foaming agent, is melded and molded, so that a foaming molded article is obtained (ref: Patent Document 1).

CITATION LIST

Patent Document

Patent Document 1: U.S. Unexamined Patent Application Publication No. 2012/0329892

SUMMARY OF THE INVENTION

Problem to be Solved by the Invention

In the thermoplastic polyurethane resin of the above-described Patent Document 1, mechanical properties such as tear strength are insufficient, and further improvement of the mechanical properties are required.

An object of the present invention is to provide a foaming thermoplastic polyurethane resin having excellent mechanical properties.

Means for Solving the Problem

The present invention [1] includes a foaming thermoplastic polyurethane resin being a reaction product of a polyisocyanate component containing a bis(isocyanatomethyl) cyclohexane and a polyol component, wherein in a peak of chromatogram obtained by measurement of the foaming thermoplastic polyurethane resin with gel permeation chromatography, the area of a high molecular weight component having a weight average molecular weight of 400,000 or more with respect to the total area of the peak is 25% or more and 60% or less.

The present invention [2] includes the foaming thermoplastic polyurethane resin described in the above-described [1], wherein an aggregation temperature of the foaming thermoplastic polyurethane resin measured with a differential scanning calorimeter is 90° C. or more and 180° C. or less.

The present invention [3] includes the foaming thermoplastic polyurethane resin described in the above-described [1] or [2], wherein the bis(isocyanatomethyl)cyclohexane is a 1,4-bis(isocyanatomethyl)cyclohexane.

The present invention [4] includes the foaming thermoplastic polyurethane resin described in the above-described [3], wherein the 1,4-bis(isocyanatomethyl)cyclohexane contains a trans-isomer at a ratio of 70 mol % or more and 96 mol % or less.

The present invention [5] includes a method for producing a foaming thermoplastic polyurethane resin including a reaction step of obtaining a primary product by allowing a polyisocyanate component containing a bis(isocyanatomethyl)cyclohexane to react with a polyol component and a heat treatment step of heat treating the primary product at 50° C. or more and 100° C. or less for 3 days or more and 10 days or less.

The present invention [6] includes a molded article containing the foaming thermoplastic polyurethane resin described in any one of the above-described [1] to [4].

The present invention [7] includes the molded article described in the above-described [6] being a midsole.

The present invention [8] includes the molded article described in the above-described [7] being a shock absorber.

The present invention [9] includes the molded article described in the above-described [6] being a chemical mechanical polishing pad.

The present invention [10] includes the molded article described in the above-described [6] being an automobile interior member.

Effect of the Invention

The foaming thermoplastic polyurethane resin of the present invention contains a high molecular weight component having a weight average molecular weight in a specific range at a specific ratio. Thus, breaking of foam at the time of foaming can be reduced, and a uniform minute cell can be obtained. As a result, excellent mechanical properties can be achieved.

According to the method for producing a foaming thermoplastic polyurethane resin of the present invention, the heat treatment step of a relatively long period of time is included, so that the foaming thermoplastic polyurethane resin can contain the high molecular weight component at a specific ratio. Thus, the foaming thermoplastic polyurethane resin having excellent mechanical properties can be obtained.

The molded article of the present invention is molded from the foaming thermoplastic polyurethane resin of the present invention, so that excellent mechanical properties can be achieved.

BRIEF DESCRIPTION OF THE DRAWINGS

FIG. 1 shows chromatogram at the time of measurement of a foaming thermoplastic polyurethane resin of Example 2 and Comparative Example 1 with gel permeation chromatography.

DESCRIPTION OF EMBODIMENTS

A foaming thermoplastic polyurethane resin (i.e. a thermoplastic polyurethane resin for foaming) of the present invention is obtained by allowing a polyisocyanate component to react with a polyol component.

That is, the foaming thermoplastic polyurethane resin of the present invention is a reaction product of the polyisocyanate component with the polyol component.

In the present invention, the polyisocyanate component contains a bis(isocyanatomethyl)cyclohexane as an essential component.

Examples of the bis(isocyanatomethyl)cyclohexane include 1,3-bis(isocyanatomethyl)cyclohexane and 1,4-bis (isocyanatomethyl)cyclohexane. Preferably, in view of symmetrical structure and improvement of rigidity of the foaming thermoplastic polyurethane resin, a 1,4-bis (isocyanatomethyl)cyclohexane is used.

The 1,4-bis(isocyanatomethyl)cyclohexane includes a stereoisomer of cis-1,4-bis(isocyanatomethyl)cyclohexane (hereinafter, referred to as a cis-1,4 isomer) and trans-1,4-bis(isocyanatomethyl)cyclohexane (hereinafter, referred to as a trans-1,4 isomer). In the present invention, the 1,4-bis (isocyanatomethyl)cyclohexane contains the trans-1,4 isomer at a ratio of, for example, 60 mol % or more, preferably 70 mol % or more, more preferably 80 mol % or more, further more preferably 85 mol % or more, and for example, 99 mol % or less, preferably 96 mol % or less, more preferably 90 mol % or less. In other words, in the 1,4-bis (isocyanatomethyl)cyclohexane, the total amount of the trans-1,4 isomer and the cis-1,4 isomer is 100 mol %, so that the cis-1,4 isomer is contained at a ratio of, for example, 1 mol % or more, preferably 4 mol % or more, more preferably 10 mol % or more, and for example, 40 mol % or less, preferably 30 mol % or less, more preferably 20 mol % or less, further more preferably 15 mol % or less.

When the content ratio of the trans-1,4 isomer is the above-described lower limit or more, the mechanical properties of a polyurethane foaming molded article to be obtained (described later) can be improved. When the content ratio of the trans-1,4 isomer is the above-described upper limit or less, the hardness, the breaking strength, and the tear strength of the polyurethane foaming molded article to be obtained (described later) can be improved.

The bis(isocyanatomethyl)cyclohexane can be produced from, for example, a commercially available bis(aminomethyl)cyclohexane and a bis(aminomethyl)cyclohexane obtained by a method described in Japanese Unexamined Patent Publication No. 2011-6382 by, for example, a heat and cold two-step phosgenation method (direct method) and a salification method described in Japanese Unexamined Patent Publication No. H7-309827 and Japanese Unexamined Patent Publication No. 2014-55229, and a non-phosgenation method described in Japanese Unexamined Patent Publication No. 2004-244349 and Japanese Unexamined Patent Publication No. 2003-212835.

The bis(isocyanatomethyl)cyclohexane can be also prepared as a modified product as long as the excellent effect of the present invention is not damaged.

Examples of the modified product of the bis(isocyanatomethyl)cyclohexane include multimers of the bis(isocyanatomethyl)cyclohexane (dimer (for example, uretodione modified product or the like), trimer (for example, isocyanurate modified product, iminooxadiazinedione modified product, or the like), or the like); biuret modified products (for example, biuret modified product or the like produced by reaction of the bis(isocyanatomethyl)cyclohexane with water); allophanate modified products (for example, allophanate modified product or the like produced by reaction of the bis(isocyanatomethyl)cyclohexane with a monohydric alcohol or a dihydric alcohol); polyol modified products (for example, polyol modified product (adduct) or the like produced by reaction of the bis(isocyanatomethyl)cyclohexane with a trihydric alcohol); oxadiazine trione modified products (for example, oxadiazine trione or the like produced by reaction of the bis(isocyanatomethyl)cyclohexane with a carbonic acid gas); and carbodiimide modified products (for example, carbodiimide modified product or the like produced by decarboxylation condensation reaction of the bis (isocyanatomethyl)cyclohexane).

The polyisocyanate component can also contain another polyisocyanate such as an aliphatic polyisocyanate, an aromatic polyisocyanate, and an araliphatic polyisocyanate as an optional component as long as the excellent effect of the present invention is not damaged.

Examples of the aliphatic polyisocyanate include ethylene diisocyanate, trimethylene diisocyanate, tetramethylene diisocyanate, pentamethylene diisocyanate (PDI), hexamethylene diisocyanate (HDI), octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecamethylene triisocyanate, 1,3,6-hexamethylene triisocyanate, 1,8-diisocyanate-4-isocyanatomethyl octane, 2,5,7-trimethyl-1,8-diisocyanate-5-isocyanatomethyl octane, bis(isocyanatoethyl)carbonate, bis(isocyanatoethyl) ether, 1,4-butylene glycol dipropylether-ω,ω'-diisocyanate, lysine isocyanatomethyl ester, lysine triisocyanate, 2-isocyanatoethyl-2,6-diisocyanate hexanoate, 2-isocyanatopropyl-2,6-diisocyanate hexanoate, bis(4-isocyanate-n-butylidene)pentaerythritol, and 2,6-diisocyanatemethylcaproate.

An example of the aliphatic polyisocyanate includes an alicyclic polyisocyanate (excluding bis(isocyanatomethyl) cyclohexane).

Examples of the alicyclic polyisocyanate (excluding the bis(isocyanatomethyl)cyclohexane) include isophorone diisocyanate (IPDI), trans-trans-, trans-cis-, and cis-cis-dicyclohexylmethane diisocyanate and a mixture thereof (hydrogenated MDI), 1.3- or 1,4-cyclohexane diisocyanate and a mixture thereof, 1.3- or 1,4-bis(isocyanatoethyl)cyclohexane, methylcyclohexane diisocyanate, 2,2'-dimethyldicyclohexylmethane diisocyanate, dimer acid diisocyanate, 2,5-diisocyanatomethylbicyclo[2,2,1]-heptane, 2,6-diisocyanatomethylbicyclo[22,21]-heptane (NBDI) that is an isomer thereof. 2-isocyanatomethyl-2-(3-isocyanatopropyl)-5-isocyanatomethylbicyclo-[2,2,1]-heptane, 2-isocyanatomethyl-2-(3-isocyanatopropyl)-6-isocyanatomethylbicyclo-[2,2,1]-heptane, 2-isocyanatomethyl-3-(3-isocyanatopropyl)-5-(2-isocyanatoethyl)-bicyclo-[2,2, I]-heptane. 2-isocyanatomethyl-3-(3-isocyanatopropyl)-6-(2-iso- cyanatoethyl)-bicyclo-[2,2,1]-heptane, 2-isocyanatomethyl-2-(3-isocyanatopropyl)-5-(2-isocyanatoethyl)-bicyclo-[2,2,1]-heptane, and 2-isocyanatomethyl-2-(3-isocyanatopropyl)-6-(2-isocyanatoethyl)-bicyclo-[2,2,1]-heptane.

Examples of the aromatic polyisocyanate include 2,4-tolylene diisocyanate, 2,6-tolylene diisocyanate, and an isomer mixture of the tolylene diisocyanate (TDI); 4,4'-diphenylmethane diisocyanate, 2,4'-diphenylmethane diisocyanate, 2,2'-diphenylmethane diisocyanate, and an optional isomer mixture of the diphenylmethane diisocyanate (MDI); toluidine diisocyanate (TODI); paraphenylene diisocyanate; and naphthalene diisocyanate (NDI)

Examples of the araliphatic polyisocyanate include 1,3- or 1,4-xylylene diisocyanate and a mixture thereof (XDI), and 1,3- or 1,4-tetramethylxylylene diisocyanate and a mixture thereof (TMXDI).

These other polyisocyanates can be used alone or in combination of two or more.

The other polyisocyanate can be also prepared as a modified product as long as the excellent effect of the present invention is not damaged.

Examples of the modified product of the other polyisocyanate include multimers (dimer, trimer, or the like), biuret modified products, allophanate modified products, polyol modified products, oxadiazinetrione modified products, and carbodiimide modified products of the other polyisocyanate.

The content ratio of the other polyisocyanate with respect to the total amount of the polyisocyanate component is, for example, 50 mass % or less, preferably 30 mass % or less, more preferably 20 mass % or less.

The polyisocyanate component can contain a monoisocyanate as an optional component as long as the excellent effect of the present invention is not damaged.

Examples of the monoisocyanate include methyl isocyanate, ethyl isocyanate, n-hexyl isocyanate, cyclohexyl isocyanate, 2-ethylhexyl isocyanate, phenyl isocyanate, and benzyl isocyanate.

The content ratio of the monoisocyanate with respect to the total amount of the polyisocyanate component is, for example, 20 mass % or less, preferably 10 mass % or less.

As the polyisocyanate component, preferably, a bis(isocyanatomethyl)cyclohexane is used alone.

In the present invention, as the polyol component, a component having a molecular weight of 60 or more and 5000 or less and containing a compound having two or more hydroxyl groups in a molecule (hereinafter, referred to as a hydroxyl group-containing compound) is usually used. As the polyol component, preferably, a first polyol component having a molecular weight of 400 or more and 5000 or less, and a second polyol component having a molecular weight of 60 or more and below 400 are used in combination.

When a polymer is contained in the polyol component, as the molecular weight of the polymer, a number average molecular weight is used. In such a case, the number average molecular weight can be determined with measurement by a GPC method, and a hydroxyl value and formulation of each of the components polymerizing the polymer (hereinafter, the same).

As the first polyol component, for example, a compound having a molecular weight within the above-described range and having two or more hydroxyl groups in a molecule is used, and preferably, a polymer having a number average molecular weight within the above-described range and having two or more hydroxyl groups in a molecule is used.

To be specific, examples of the first polyol component include polyether polyol, polyester polyol, polycarbonate polyol, vegetable oil polyol, polyolefin polyol, and acrylic polyol.

Examples of the polyether polyol include polyoxyalkylene polyol and polytetramethylene ether polyol.

The polyoxyalkylene polyol is an addition polymer of an alkylene oxide with a low molecular weight polyol, a low molecular weight polyamine, or the like as an initiator.

An example of the low molecular weight polyol includes the second polyol to be described later.

Examples of the alkylene oxide include propylene oxide, ethylene oxide, and butylene oxide. These alkylene oxides can be used alone or in combination of two or more. Among these, preferably, a propylene oxide and an ethylene oxide are used. An example of the polyoxyalkylene polyol includes a polyethylene glycol, a polypropylene glycol, and a random and/or block copolymer of a propylene oxide and an ethylene oxide.

An example of the polytetramethylene ether polyol includes a ring-opening polymer (polytetramethylene ether glycol) obtained by cationic polymerization of tetrahydrofuran and an amorphous (noncrystalline) polytetramethylene ether glycol that copolymerizes an alkyl-substituted tetrahydrofuran or a dihydric alcohol (described later) with a polymerization unit of tetrahydrofuran.

The amorphous (noncrystalline) is defined as a state of being liquid at a normal temperature (25° C.) (hereinafter, the same).

An example of the polyester polyol includes a polycondensate obtained by allowing the above-described low molecular weight polyol to react with a polybasic acid under known conditions.

Examples of the polybasic acid include saturated aliphatic dicarboxylic acids such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, and other saturated aliphatic dicarboxylic acids (carbon number of 11 to 13); unsaturated aliphatic dicarboxylic acids such as maleic acid, fumaric acid, itaconic acid, and others; aromatic dicarboxylic acids such as orthophthalic acid, isophthalic acid, terephthalic acid, toluene dicarboxylic acid, naphthalene dicarboxylic acid, and others; alicyclic dicarboxylic acids such as hexahydrophthalic acid and others; other carboxylic acids such as dimer acid, hydrogenated dimer acid, HET acid, and others; anhydrides derived from the carboxylic acids such as oxalic anhydrides, succinic anhydrides, maleic anhydrides, phthalic anhydrides, 2-alkyl (C12 to C18) succinic anhydrides, tetrahydrophthalic anhydrides, and trimellitic anhydrides; and furthermore, acid halides derived from the carboxylic acids such as oxalyl dichlorides, adipic acid dichlorides, and sebacic acid dichlorides.

An example of the polyester polyol includes a polyester polyol derived from plants, to be specific, a plant oil-based polyester polyol obtained by subjecting a hydroxy carboxylic acid such as hydroxyl group-containing vegetable oil fatty acid (for example, castor oil fatty acid containing a ricinoleic acid, hydrogenated castor oil fatty acid containing a 12-hydroxystearic acid, or the like) to condensation reaction under known conditions with the above-described low molecular weight polyol as an initiator.

Examples of the polyester polyol include a lactone-based polyester polyol including a polycaprolactone polyol and a polyvalerolactone polyol obtained by subjecting lactones such as ε-caprolactone and γ-valerolactone and lactides such as L-lactide and D-lactide to ring-opening polymerization with the above-described low molecular weight polyol (preferably, dihydric alcohol (described later)) as the initiator, and furthermore, a copolymer of these with the dihydric alcohol (described later).

Examples of the polycarbonate polyol include a ring-opening polymer of ethylene carbonate with the above-described low molecular weight polyol (preferably, dihydric alcohol (described later)) as an initiator and an amorphous polycarbonate polyol obtained by copolymerizing the dihydric alcohols (described later) such as 1,4-butanediol, 1,5-pentanediol, 3-methyl-1,5-pentanediol, and 1,6-hexanediol with the ring-opening polymer.

Examples of the vegetable oil polyol include hydroxyl group-containing vegetable oils such as castor oil and coconut oil. Also, examples thereof include a castor oil polyol and an ester-modified castor oil polyol obtained by allowing a castor oil fatty acid to react with a polypropylene polyol.

Examples of the polyolefin polyol include a polybutadiene polyol and a partially saponified ethylene-vinyl acetate copolymer.

An example of the acrylic polyol includes a copolymer obtained by copolymerizing a hydroxyl group-containing acrylate with a copolymerizable vinyl monomer that is copolymerizable with the hydroxyl group-containing acrylate.

Examples of the hydroxyl group-containing acrylate include 2-hydroxyethyl (meth)acrylate, hydroxypropyl (meth)acrylate, hydroxybutyl (meth)acrylate, 2,2-dihydroxymethylbutyl (meth)acrylate, polyhydroxyalkyl maleate, and polyhydroxyalkyl fumarate. Preferably, a 2-hydroxyethyl (meth)acrylate is used.

Examples of the copolymerizable vinyl monomer include alkyl (meth)acrylates (carbon number of 1 to 12) such as methyl (meth)acrylate, ethyl (meth)acrylate, propyl (meth) acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, isononyl (meth)acrylate, 2-ethylhexyl (meth)acrylate, and cyclohexyl acrylate; aromatic vinyls such as styrene, vinyltoluene, and α-methylstyrene; vinyl cyanides such as (meth)acrylonitrile; vinyl monomers containing a carboxyl group such as (meth)acrylic acid, fumaric acid, maleic acid, and itaconic acid or alkyl esters thereof; alkanepolyol poly(meth)acrylates such as ethyleneglycol di(meth)acrylate, butyleneglycol di(meth)acrylate, hexanediol di(meth)acrylate, and oligoethyleneglycol di(meth)acrylate; and vinyl monomers containing an isocyanate group such as 3-(2-isocyanate-2-propyl)-α-methylstyrene.

The acrylic polyol can be obtained by copolymerizing the hydroxyl group-containing acrylate with the copolymerizable vinyl monomer under the presence of an appropriate solvent and a polymerization initiator.

Examples of the acrylic polyol include a silicone polyol and a fluorine polyol.

An example of the silicone polyol includes an acrylic polyol in which a silicone compound containing a vinyl group such as γ-methacryloxypropyltrimethoxysilane is blended as a copolymerizable vinyl monomer in the copolymerization of the above-described acrylic polyol.

An example of the fluorine polyol includes an acrylic polyol in which a fluorine compound containing a vinyl group such as tetrafluoroethylene and chlorotrifluoroethylene is blended as a copolymerizable vinyl monomer in the copolymerization of the above-described acrylic polyol.

These first polyol components can be used alone or in combination of two or more.

As the first polyol component, preferably, a polyether polyol and a polyester polyol are used, more preferably, a polyethylene glycol, a polytetramethylene ether glycol, and a polycaprolactone polyol are used, further more preferably, a polycaprolactone polyol is used.

When the first polyol component is the above-described polyol, a polyurethane foaming molded article (described later) having excellent mechanical properties such as breaking strength and tear strength can be obtained.

The number average molecular weight of the first polyol component is, for example, 400 or more, preferably 500 or more, more preferably 1000 or more, further more preferably 2000 or more, and for example, 5000 or less, preferably 4000 or less, more preferably 3000 or less.

When the molecular weight of the first polyol component is within the above-described range, excellent mechanical properties can be developed even in the case of an increase in an expansion ratio.

An example of the second polyol component includes a compound (monomer) having two or more hydroxyl groups in a molecule and having a molecular weight of 60 or more and below 400.

To be specific, examples of the second polyol component include polyhydric alcohols including dihydric alcohols such as ethylene glycol, 1,3-propylene glycol, 1,2-propylene glycol, 1,4-buthylene glycol (1,4-butane diol, 1,4-BD), 1,3-butylene glycol, 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to C11) diol, cyclohexanedimethanol (1,3- or 1,4-cyclohexanedimethanol and a mixture thereof), cyclohexanediol (1,3- or 1,4-cyclohexanediol and a mixture thereof), 1,4-dihydroxy-2-butene, 2,6-dimethyl-1-octene-3,8-diol, diethylene glycol, triethylene glycol, dipropylene glycol, 1,2-benzenediol (also known as catechol), 1,3-benzenediol, 1,4-benzenediol, bisphenol A and hydrogenated product thereof; trihydric alcohols such as glycerin, trimethylol propane, and triisopropanolamine; and tetrahydric alcohols such as tetramethylolmethane (pentaerythritol) and diglycerin.

These second polyol components can be used alone or in combination of two or more.

As the second polyol component, preferably, a dihydric alcohol is used, more preferably, a 1,4-butanediol is used.

When the second polyol component is the above-described polyol, a polyurethane foaming molded article (described later) having excellent mechanical properties such as breaking strength can be obtained.

The number average molecular weight of the second polyol component is, for example, 60 or more, preferably 80 or more, and for example, below 400, preferably, below 300.

When the molecular weight of the second polyol component is within the above-described range, the expansion ratio can be increased, and a light polyurethane foaming molded article (described later) can be obtained.

In the polyol component, as the content ratio of the first polyol component and the second polyol component, the ratio of the first polyol component with respect to the total amount of the first polyol component and the second polyol component is, for example, 5 mol % or more, preferably 7 mol % or more, more preferably 10 mol % or more, further more preferably 20 mol % or more, and for example, 75 mol %/o or less, preferably 65 mol % or less, more preferably 50 mol % or less. The ratio of the second polyol component with respect to the total amount of the first polyol component and the second polyol component is, for example, 25 mol % or more, preferably 35 mol % or more, more preferably 50 mol % or more, and for example, 95 mol % or less, preferably 93 mol % or less, more preferably 90 mol % or less, further more preferably 80 mol % or less.

When the content ratio of the first polyol component and the second polyol component is within the above-described range, the mechanical properties of the polyurethane foaming molded article to be obtained (described later) can be improved.

The foaming thermoplastic polyurethane resin of the present invention can be obtained by a producing method including a reaction step and a heat treatment step.

The reaction step is a step of obtaining a primary product (reaction product before heat treatment) by allowing the above-described polyisocyanate component to react with the above-described polyol component.

To react each of the components described above (polyisocyanate component, polyol component), for example, a known method such as one shot method and prepolymer method is used. Preferably, a prepolymer method is used.

When each of the components described above reacts by the prepolymer method, a polyurethane foaming molded article (described later) having excellent mechanical properties can be obtained.

To be specific, in the prepolymer method, first, the polyisocyanate component reacts with the first polyol component, so that an isocyanate group-terminated polyurethane prepolymer is synthesized (prepolymer synthesis step).

In the prepolymer synthesis step, the polyisocyanate component reacts with the first polyol component by, for example, a polymerization method such as bulk polymerization and solution polymerization.

In the bulk polymerization, for example, under a nitrogen gas stream, the polyisocyanate component reacts with the first polyol component at a reaction temperature of, for example, 50° C. or more, and for example, 250° C. or less, preferably 200° C. or less for, for example, 0.5 hours or more, and for example, 15 hours or less.

In the solution polymerization, the polyisocyanate component and the first polyol component are added to an organic solvent to react at a reaction temperature of, for example, 50° C. or more, and for example, 120° C. or less, preferably 100° C. or less for, for example, 0.5 hours or more, and for example, 15 hours or less.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethyl benzene; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutylacetate, and ethyl-3-ethoxypropionate; ethers such as diethyl ether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic polar solvents such as N-methyl pyrrolidone, dimethyl formamide, N,N'-dimethylacetamide, dimethyl sulfoxide, and hexamethylphosphonylamide.

Furthermore, in the above-described polymerization reaction, for example, a known urethane-formation catalyst such as amines and organic metal compound can be added as needed.

Examples of the amines include tertiary amines such as triethylamine, triethylenediamine, bis-(2-dimethylaminoethyl) ether, and N-methylmorpholine; quaternary ammonium salts such as tetraethylhydroxylammonium; and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate, dibutyltin dineodecanoate, dioctyltin dimercaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate; organic copper compounds such as copper octenoate; and organic bismuth compounds such as bismuth octanoate (bismuth octylate) and bismuth neodecanoate, and preferably, a tin octylate and a bismuth octylate are used.

Furthermore, examples of the urethane-formation catalyst include potassium salts such as potassium carbonate, potassium acetate, and potassium octylate.

These urethane-formation catalysts can be used alone or in combination of two or more.

The addition ratio of the urethane-formation catalyst with respect to 10000 parts by mass of the total amount of the polyisocyanate component and the first polyol component is, for example, 0.001 parts by mass or more, preferably 0.01 parts by mass or more, and for example, 1 part by mass or less, preferably 0.5 parts by mass or less.

In the above-described polymerization reaction, an unreacted polyisocyanate component, a catalyst, and an organic solvent (when the catalyst and the organic solvent are used) can be removed by, for example, a known removing method such as distillation and extraction.

In the prepolymer synthesis step, as the mixing ratio of each of the components, the equivalent ratio (isocyanate group/hydroxyl group) of the isocyanate group in the polyisocyanate component with respect to the hydroxyl group in the first polyol component is, for example, 2.0 or more, preferably 2.5 or more, and for example, 20 or less, preferably 15 or less, more preferably 10 or less, further more preferably 6.0 or less.

To be more specific, as the mixing ratio of each of the components in the prepolymer synthesis step, the ratio of the polyisocyanate component with respect to 100 parts by mass of the first polyol component is, for example, 5 parts by mass or more, preferably 10 parts by mass or more, more preferably 15 parts by mass or more, and for example, 100 parts by mass or less, preferably 70 parts by mass or less, more preferably 50 parts by mass or less, further more preferably 30 parts by mass or less.

In the method, the above-described components react until the content ratio of the isocyanate group reaches, for example, 1.0 mass % or more, preferably 3.0 mass % or more, more preferably 4.0 mass % or more, and for example, 30.0 mass % or less, preferably 19.0 mass % or less, more preferably 16.0 mass % or less, further more preferably 12.0 mass % or less, further more preferably 10.0 mass % or less, particularly preferably 5.0 mass % or less. In this manner, the isocyanate group-terminated polyurethane prepolymer can be obtained.

The isocyanate group content (content ratio of the isocyanate group) can be obtained by a known method such as titration method by di-n-butylamine and FT-IR analysis.

Next, in this method, the isocyanate group-terminated polyurethane prepolymer obtained as described above reacts with the second polyol component, so that a primary product of the polyisocyanate component and the polyol component is obtained (chain extension step).

That is, in this method, the second polyol component is a chain extension agent.

In the chain extension step, the isocyanate group-terminated polyurethane prepolymer reacts with the second polyol component by, for example, a polymerization method such as the above-described bulk polymerization and the above-described solution polymerization.

The reaction temperature is, for example, a room temperature or more, preferably 50° C. or more, and for example, 200° C. or less, preferably 150° C. or less, and the reaction time is, for example, 5 minutes or more, preferably 1 hour or more, and for example, 72 hours or less, preferably 48 hours or less.

As the mixing ratio of each of the components, the equivalent ratio (isocyanate group/hydroxyl group) of the isocyanate group in the isocyanate group-terminated polyurethane prepolymer with respect to the hydroxyl group in the second polyol component is, for example, 0.75 or more, preferably 0.9 or more, and for example, 1.3 or less, preferably 1.1 or less.

To be more specific, as the mixing ratio of each of the components in the chain extension step, the ratio of the second polyol component with respect to 100 parts by mass of the isocyanate group-terminated polyurethane prepolymer is, for example, 1.0 part by mass or more, preferably 2.0 parts by mass or more, more preferably 3.0 parts by mass or more, and for example, 30 parts by mass or less, preferably 20 parts by mass or less, more preferably 15 parts by mass or less, further more preferably 10 parts by mass or less, particularly preferably 6.0 parts by mass or less.

In the chain extension step, to adjust the hard segment concentration (described later) of the foaming thermoplastic polyurethane resin to be obtained, the first polyol component can be also blended in addition to the second polyol component.

In the chain extension step, when the first polyol component is blended, the mixing ratio thereof with respect to 100 parts by mass of the isocyanate group-terminated polyurethane prepolymer is, for example, 5 parts by mass or more, preferably 10 parts by mass or more, more preferably 50 parts by mass or more, and for example, 120 parts by mass or less, preferably 10 parts by mass or less, and the mixing ratio thereof with respect to 1 part by mass of the second polyol component is, for example, 10 parts by mass or more, preferably 20 parts by mass or more, and for example, 100 parts by mass or less, preferably 50 parts by mass or less, more preferably 30 parts by mass or less.

Furthermore, in the reaction, the above-described urethane-formation catalyst can be added as needed. The urethane-formation catalyst can be blended in the isocyanate group-terminated polyurethane prepolymer and/or the second polyol component, and also can be separately blended at the time of mixture of these.

As the method for obtaining the above-described primary product, when the one shot method is used, the polyisocyanate component and the polyol component (including the first polyol component and the second polyol component) are simultaneously blended to be stirred and mixed at such a ratio that the equivalent ratio (isocyanate group/hydroxyl group) of the isocyanate group in the polyisocyanate component with respect to the hydroxyl group in the polyol component is, for example, 0.9 or more, preferably 0.95 or more, more preferably 0.98 or more, and for example, 1.2 or less, preferably 1.1 or less, more preferably 1.08 or less.

The stirring and mixing is, for example, performed under an inert gas (for example, nitrogen) atmosphere at a reaction temperature of, for example, 40° C. or more, preferably 100° C. or more, and for example, 280° C. or less, preferably 260° C. or less and a reaction time of, for example, 30 seconds or more and 1 hour or less.

The method for the stirring and mixing is not particularly limited, and a method for the stirring and mixing by using a known mixing device such as mixing tank equipped with a disper, a dissolver, and a turbine blade, circulation-type low pressure or high pressure impingement mixing device, high-speed stirring mixer, static mixer, kneader, uniaxial or biaxial rotation extruder, and belt conveyor is used.

At the time of the stirring and mixing, the above-described urethane-formation catalyst and the above-described organic solvent can be added at an appropriate ratio as needed.

The heat treatment step is a step of obtaining a secondary product (reaction product after the heat treatment, that is, the foaming thermoplastic polyurethane resin that is a reaction product) by subjecting the above-described primary product to heat treatment.

In the heat treatment step, the primary product obtained in the above-described reaction step is subjected to heat treatment by being left to stand for a predetermined heat treatment period at a predetermined heat treatment temperature to be thereafter dried at 50° C. or more and 100° C. or less for 6 hours or more and 3 days or less.

The heat treatment temperature is, for example, 50° C. or more, preferably 60° C. or more, more preferably 70° C. or more, and for example, 100° C. or less, preferably 90° C. or less.

When the heat treatment temperature is the above-described lower limit or more, a high molecular weight component can be efficiently contained at a predetermined ratio, and when the heat treatment temperature is the above-described upper limit or less, the resistance to discoloration by ultraviolet light (UV) of the polyurethane foaming molded article to be obtained (described later) can be improved.

The heat treatment period is, for example, 3 days or more, preferably 4 days or more, more preferably 5 days or more, further more preferably 6 days or more, and for example, 10 days or less, preferably 9 days or less, more preferably 8 days or less.

When the heat treatment period is the above-described lower limit or more, a high molecular weight component can be contained in the foaming thermoplastic polyurethane resin to be obtained at a predetermined amount or more, so that the mechanical properties of the polyurethane foaming molded article to be obtained (described later) can be improved, and when the heat treatment period is the above-described upper limit or less, the high molecular weight component content in the foaming thermoplastic polyurethane resin to be obtained can be suppressed at a predetermined amount or less, so that the mechanical properties and the resistance to discoloration by ultraviolet light (UV) of the polyurethane foaming molded article to be obtained (described later) can be improved.

In this manner, the foaming thermoplastic polyurethane resin can be obtained.

Also, a known additive can be added to the foaming thermoplastic polyurethane resin as needed. Examples thereof include antioxidants, heat resistant stabilizers, ultraviolet absorbers, light resistant stabilizers, furthermore, plasticizers, blocking inhibitors, release agents, pigments, dyes, lubricants, fillers, hydrolysis inhibitors, corrosion inhibitors, fillers, and bluing agents. These additives may be added at the time of the mixture, at the time of the synthesis, or after the synthesis of each of the components.

The heat resistant stabilizer is not particularly limited, and a known heat resistant stabilizer (for example, described in a catalog of BASF Japan) is used. To be more specific, examples thereof include phosphorus-based treatment heat stabilizer, lactone-based treatment heat stabilizer, and sulfur-based treatment heat stabilizer.

The ultraviolet absorber is not particularly limited, and a known ultraviolet absorber (for example, described in a catalog of BASF Japan) is used. To be more specific, examples thereof include benzotriazole ultraviolet absorber, triazine ultraviolet absorber, and benzophenone ultraviolet absorber.

The light resistant stabilizer is not particularly limited, and a known light resistant stabilizer (for example, described in a catalog of ADEKA CORPORATION) is used. To be more specific, examples thereof include benzoate light stabilizer and hindered amine light stabilizer.

Each of these additives is added with respect to the foaming thermoplastic polyurethane resin at a ratio of, for example, 0.01 mass % or more, preferably 0.1 mass % or more, and for example, 3.0 mass % or less, preferably 2.0 mass % or less.

The foaming thermoplastic polyurethane resin of the present invention obtained by the producing method contains the high molecular weight component (component having a weight average molecular weight of 400,000 or more, preferably 500,000 or more) at a specific ratio. Thus, the mechanical properties of the polyurethane foaming molded article to be obtained (described later) can be improved.

To be specific, the content ratio of the high molecular weight component of the foaming thermoplastic polyurethane resin corresponds to the area of the high molecular weight component having a weight average molecular weight of 400,000 or more with respect to the total area of the peak in the peak of the chromatogram obtained by measurement of the foaming thermoplastic polyurethane resin with gel permeation chromatography, and is, for example, 25% or more, preferably 30% or more, more preferably 36% or more, further more preferably 40% or more, particularly preferably 44% or more, and 60% or less, preferably 55% or less, more preferably 50% or less, further more preferably 46% or less, particularly preferably 45% or less. The peak of the chromatogram is a molecular weight distribution curve derived from the foaming thermoplastic polyurethane resin, and the peak derived from impurities such as solvent is removed.

In the present invention, the content ratio of the high molecular weight component of the foaming thermoplastic polyurethane resin can be measured with gel permeation chromatography equipped with a differential refractometer (GPC measurement) under the specific conditions (ref: Examples to be described later).

To be specific, in the present invention, the obtained foaming thermoplastic polyurethane resin is, for example, immersed in N-methylpyrrolidone to be stirred and dissolved at, for example, 80° C. or more and 120° C. or less (preferably, about 100° C.) for, for example, 2 hours or more and 8 hours or less, and the obtained solution is cooled until a room temperature (25° C.) to be then filtrated, thereby preparing a sample solution. Then, the sample solution is subjected to GPC measurement in accordance with the conditions of Examples to be described later by using gel permeation chromatography equipped with the differential refractometer.

When the high molecular weight component of the foaming thermoplastic polyurethane resin is the above-described lower limit or more, the elongational viscosity can be increased, and breaking of foam at the time of foaming can be reduced, so that uniformity of a minute cell can be retained. As a result, the mechanical properties of the polyurethane foaming molded article to be obtained (described later) can be improved.

When the high molecular weight component of the foaming thermoplastic polyurethane resin is the above-described upper limit or less, an extreme increase of the elongational viscosity can be suppressed, so that foaming can be easily controlled. As a result, the deterioration of the polyurethane foaming molded article to be obtained (described later) based on heat and shearing can be suppressed, and the resistance to discoloration by ultraviolet light (UV) can be improved.

The hard segment concentration of the foaming thermoplastic polyurethane resin is, for example, 3 mass % or more, preferably 5 mass % or more, more preferably 8 mass % or more, and for example, 55 mass % or less, preferably 50 mass % or less, more preferably 45 mass % or less, further more preferably 35 mass % or less, particularly preferably 20 mass % or less.

When the hard segment concentration of the foaming thermoplastic polyurethane resin is within the above-described range, the uniformity of the cell that constitutes the polyurethane foaming molded article to be obtained (described later) can be improved.

The hard segment (hard segment formed by reaction of the polyisocyanate component with the second polyol component) concentration of the foaming thermoplastic polyurethane resin can be, for example, calculated from the mixing ratio (charging) of each of the components (ref: Examples to be described later).

The aggregation temperature of the foaming thermoplastic polyurethane resin corresponds to that of the hard segment phase in the foaming thermoplastic polyurethane resin, and is, for example, 75° C. or more, preferably 90° C. or more, more preferably 100° C. or more, further more preferably 110° C. or more, particularly preferably 130° C. or more, and for example, 200° C. or less, preferably 180° C. or less, more preferably 170° C. or less, further more preferably 150° C. or less, particularly preferably 140° C. or less.

When the aggregation temperature of the foaming thermoplastic polyurethane resin is the above-described lower limit or more, the breaking strength and the tear strength of the polyurethane foaming molded article to be obtained (described later) can be improved, and when the aggregation temperature of the foaming thermoplastic polyurethane resin is the above-described upper limit or less, improvement of the rebound resilience and suppression of the compression permanent set of the polyurethane foaming molded article to be obtained (described later) can be achieved.

The aggregation temperature of the foaming thermoplastic polyurethane resin can be, for example, measured by differential scanning calorimetry (DSC measurement) in conformity with the conditions of Examples.

The hardness (ASKER A (in conformity with JIS K7311 (1995)), ASKER D (in conformity with JIS K7311 (1995))) of the foaming thermoplastic polyurethane resin is, for example, 50 A or more, preferably 70 A or more, more preferably 72 A or more, further more preferably 75 A or more, particularly preferably 78 A or more, and for example, 60 D or less, preferably 55 D or less, more preferably 50 D or less, further more preferably 95 A or less, particularly preferably 90 A or less, especially preferably 85 A or less.

The present invention includes a molded article, to be specific, a foaming molded article including the above-described foaming thermoplastic polyurethane resin of the present invention. The foaming molded article is molded from the foaming thermoplastic polyurethane resin.

The foaming molded article can be, for example, obtained by molding the above-described foaming thermoplastic polyurethane resin by a known foaming molding method such as extrusion foaming method, injection foaming method, and bead foaming method.

To be specific, in the extrusion foaming method, for example, the above-described foaming thermoplastic polyurethane resin is melted, and a known foaming agent (for example, supercritical carbon dioxide gas) is kneaded to be then extruded, so that a polyurethane foaming molded article can be obtained.

In the injection foaming method, for example, the above-described foaming thermoplastic polyurethane resin is melted, and a known foaming agent (for example, supercritical carbon dioxide gas) is kneaded to be then injected and molded with a metal mold, so that a polyurethane foaming molded article can be obtained.

In the bead foaming method, for example, the above-described foaming thermoplastic polyurethane resin is melted, and a known foaming agent (for example, supercritical carbon dioxide gas) is kneaded and then, a discharged foaming body strand is cut into a piece having an appropriate size, so that a foaming bead is obtained. The obtained foaming bead is melted and molded with a metal mold, so that a polyurethane foaming molded article can be obtained.

The uniformity (in conformity with Examples to be described later) of the cell in the obtained foaming molded article is, for example, 4 or more, preferably above 4, and for example, 5 or less.

The core density (in conformity with Examples to be described later) of the foaming molded article is, for example, 0.01 g/cm$^3$ or more, preferably 0.05 g/cm$^3$ or more, more preferably 0.10 g/cm$^3$ or more, further more preferably 0.20 g/cm$^3$ or more, and for example, 0.5 g/cm$^3$ or less, preferably 0.4 g/cm$^3$ or less, more preferably 0.30 g/cm$^3$ or less.

The hardness (in conformity with Examples to be described later, in conformity with JIS K 7312 (1996)) of the foaming molded article is, for example, 1 C or more, preferably 10 C or more, more preferably 30 C or more, further more preferably 35 C or more, and for example, 80 C or less, preferably 70 C or less, more preferably 50 C or less, further more preferably 45 C or less, particularly preferably 42 C or less.

The rebound resilience (in conformity with Examples to be described later) of the foaming molded article is, for example, 5% or more, preferably 30% or more, more preferably 40% or more, further more preferably 50% or more, particularly preferably 70% or more, especially preferably 73% or more, and for example, 85% or less, preferably 83% or less.

The compression permanent set (in conformity with Examples to be described later) of the foaming molded article is, for example, 0.1% or more, preferably 1% or more, and for example, 40% or less, preferably 25% or less, more preferably 20% or less, further more preferably 13% or less, further more preferably 11% or less, further more preferably 10% or less, particularly preferably 9% or less.

The breaking strength (in conformity with Examples to be described later) of the foaming molded article is, for example, 1.0 MPa or more, preferably 1.5 MPa or more, more preferably 1.8 MPa or more, further more preferably 2.1 MPa or more, particularly preferably 2.4 MPa or more, and for example, 5.0 MPa or less, preferably 4.5 MPa or less.

The tear strength (in conformity with Examples to be described later) of the foaming molded article is, for example, 2 kN/m or more, preferably 3 kN/m or more, more preferably 4 kN/m or more, further more preferably 6 kN/m or more, further more preferably 7 kN/m or more, particularly preferably 10 kN/m or more, and for example, 30 kN/m or less, preferably 20 kN/m or less.

The resistance to discoloration by ultraviolet light (UV) of the foaming molded article (in conformity with Examples to be described later) is, for example, 0.1 or more, preferably 0.3 or more, and for example, 5 or less, preferably 3.5 or less, more preferably 2.5 or less, further more preferably 2.3 or less, further more preferably 2.0 or less, particularly preferably 1.9 or less.

The molded article of the present invention is molded from the foaming thermoplastic polyurethane resin of the present invention, so that the obtained molded article is the polyurethane foaming molded article and has excellent mechanical properties.

Thus, the molded article of the present invention can be used in a wide variety of fields including furniture such as mattress and sofa; clothing goods such as brassiere and shoulder pad; medical supplies such as buffer materials of paper diaper, napkin, and medical tape; sanitary goods such as cosmetics, facial washing puff, and pillow; shoes articles such as sole (outsole and innersole) and midsole; footwear goods (sandals or the like) in various uses such as medical uses; furthermore, body pressure distribution goods such as pad and cushion for vehicles; members touched with a hand such as door trim, instrument panel, and gear knob; heat insulating materials of electric refrigerators and buildings; shock absorbing materials such as shock absorber; vehicle goods such as filler, vehicle handle, automobile interior member, and automobile exterior member; semiconductor production articles such as chemical mechanical polishing (CMP) pad; sports articles such as core materials of bat and grip; and poles.

Among all, the molded article of the present invention is preferably used as a midsole, a shock absorber, a chemical mechanical polishing (CMP) pad, sports articles, an automobile interior member, or the like that require high mechanical properties.

EXAMPLES

Next, the present invention is described based on Production Examples, Synthesis Examples, Examples, and Comparative Examples. The present invention is however not limited by these Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Production of Bis(isocyanatomethyl)cyclohexane

Production Example 1 (Production of 1,4-bis(isocyanatomethyl)cyclohexane (1) (Hereinafter, Referred to as 1,4-BIC (1)))

In conformity with the description of Production Example 6 of Japanese Unexamined Patent Publication No. 2014-55229, a 1,4-bis(aminomethyl)cyclohexane having a ratio of trans-isomer/cis-isomer of 98/2 having a purity of 99.5% or more was obtained at a yield of 92%.

Thereafter, in conformity with the description of Production Example 1 of Japanese Unexamined Patent Publication No. 2014-55229, a heat and cold two-step phosgenation method was performed by using the 1,4-bis(aminomethyl) cyclohexane as a material under pressure, so that 382 parts by mass of 1,4-BIC (1) was obtained.

The purity of the obtained 1,4-BIC (1) with gas chromatography measurement was 99.9%, the color phase with APHA measurement was 5, and a ratio of trans-isomer/cis-isomer with $^{13}$C-NMR measurement was 98/2. The hydrolysable chlorine concentration (hereinafter, referred to as HC concentration) was 18 ppm.

Production Example 2 (Production of 1,4-bis(isocyanatomethyl)cyclohexane (2) (Hereinafter, Referred to as 1,4-BIC (2)))

By using a 1,4-bis(aminomethyl)cyclohexane (manufactured by Mitsubishi Gas Chemical Company, Inc.) having a ratio of trans-isomer/cis-isomer of 93/7 with $^{13}$C-NMR measurement as a material, 385 parts by mass of 1,4-BIC (2) was obtained in conformity with the description of Production Example 1 of Japanese Unexamined Patent Publication No. 2014-55229.

The purity of the obtained 1,4-BIC (2) with gas chromatography measurement was 99.9%, the color phase with APHA measurement was 5, and a ratio of trans-isomer/cis-isomer with $^{13}$C-NMR measurement was 93/7. The HC concentration was 19 ppm.

Production Example 3 (Production of 1,4-bis(isocyanatomethyl)cyclohexane (3) (Hereinafter, Referred to as 1,4-BIC (3)))

A four-neck flask equipped with a stirrer, a thermometer, a reflux tube, and a nitrogen inlet tube was charged with 200 parts by mass of 1,4-BIC (1) obtained in Production Example 1 and 800 parts by mass of 1,4-BIC (2) obtained in Production Example 2 to be then stirred at a room temperature for 1 hour under a nitrogen atmosphere, so that 1000 parts by mass of 1,4-BIC (3) was obtained.

The purity of the obtained 1,4-BIC (3) with gas chromatography measurement was 99.9%, the color phase with APHA measurement was 5, and a ratio of trans-isomer/cis-isomer with $^{13}$C-NMR measurement was 94/6. The HC concentration was 19 ppm.

Production Example 4 (Production of 1,4-bis(isocyanatomethyl)cyclohexane (4) (Hereinafter, Referred to as 1,4-BIC (4)))

A four-neck flask equipped with a stirrer, a thermometer, a reflux tube, and a nitrogen inlet tube was charged with 865 parts by mass of 1,4-BIC (2) obtained in Production Example 2 and 135 parts by mass of 1,4-BIC (7) obtained in Production Example 7 to be described later to be then stirred at a room temperature for 1 hour under a nitrogen atmosphere, so that 1000 parts by mass of 1,4-BIC (4) was obtained.

The purity of the obtained 1,4-BIC (4) with gas chromatography measurement was 99.9%, the color phase with APHA measurement was 5, and a ratio of trans-isomer/cis-isomer with $^{13}$C-NMR measurement was 86/14. The HC concentration was 19 ppm.

Production Example 5 (Production of 1,4-bis(isocyanatomethyl)cyclohexane (5) (Hereinafter, Referred to as 1,4-BIC (5)))

A four-neck flask equipped with a stirrer, a thermometer, a reflux tube, and a nitrogen inlet tube was charged with 615 parts by mass of 1,4-BIC (2) obtained in Production Example 2 and 385 parts by mass of 1,4-BIC (7) obtained in Production Example 7 to be described later to be then stirred at a room temperature for 1 hour under a nitrogen atmosphere, so that 1000 parts by mass of 1,4-BIC (5) was obtained.

The purity of the obtained 1,4-BIC (5) with gas chromatography measurement was 99.9%, the color phase with APHA measurement was 5, and a ratio of trans-isomer/cis-isomer with $^{13}$C-NMR measurement was 73/27. The HC concentration was 21 ppm.

Production Example 6 (Production of 1,4-bis(isocyanatomethyl)cyclohexane (6) (Hereinafter, Referred to as 1,4-BIC (6)))

A four-neck flask equipped with a stirrer, a thermometer, a reflux tube, and a nitrogen inlet tube was charged with 462 parts by mass of 1,4-BIC (2) obtained in Production Example 2 and 538 parts by mass of 1,4-BIC (7) obtained in Production Example 7 to be described later to be then stirred at a room temperature for 1 hour under a nitrogen atmosphere, so that 1000 parts by mass of 1,4-BIC (6) was obtained.

The purity of the obtained 1,4-BIC (6) with gas chromatography measurement was 99.9%, the color phase with APHA measurement was 5, and a ratio of trans-isomer/cis-isomer with $^{13}$C-NMR measurement was 65/35. The HC concentration was 20 ppm.

Production Example 7 (Production of 1,4-bis(isocyanatomethyl)cyclohexane (7) (Hereinafter, Referred to as 1,4-BIC (7)))

By using a 1,4-bis(aminomethyl)cyclohexane (manufactured by Tokyo Chemical Industry Co., Ltd.) having a ratio of trans-isomer/cis-isomer of 41/59 with $^{13}$C-NMR measurement as a material, 388 parts by mass of 1,4-BIC (7) was obtained in conformity with the description of Production Example 1 of Japanese Unexamined Patent Publication No. 2014-55229.

The purity of the obtained 1,4-BIC (7) with gas chromatography measurement was 99.9%, the color phase with APHA measurement was 5, and a ratio of trans-isomer/cis-isomer with $^{13}$C-NMR measurement was 41/59. The HC concentration was 22 ppm.

Synthesis of Isocyanate Group-Terminated Polyurethane Prepolymer

Synthesis Examples 1 to 13

A four-neck flask equipped with a stirrer, a thermometer, a reflux tube, and a nitrogen inlet tube was charged with the polyisocyanate component and the first polyol component with the type and the mass ratio described in Table 1 to be then stirred at 80° C. for 1 hour under a nitrogen atmosphere. Thereafter, in Synthesis Examples 1, 2, 4 to 11, and 13 (isocyanate group-terminated polyurethane prepolymer (hereinafter, referred to as prepolymer) (a), (b), (d) to (k), and (m)), as a catalyst amount, 10 ppm (0.10 parts by mass with respect to 10000 parts by mass of the total amount of the polyisocyanate component and the first polyol component) of tin octylate (trade name: STANOCT, manufactured by API Corporation) diluted in 4 mass % with diisononyladipate (manufactured by J-PLUS Co., Ltd.) in advance; in Synthesis Example 3 (prepolymer (c)), 10 ppm (0.10 parts by mass with respect to 10000 parts by mass of the total amount of the polyisocyanate component and the first polyol component) of bismuth octylate (trade name: NEOSTANN U-600, manufactured by NITTO KASEI CO., LTD.) diluted in 4 mass % with diisononyladipate (manufactured by J-PLUS Co., Ltd., DINA) in advance was added with respect to the total amount of the polyisocyanate component and the first polyol component; and in Synthesis Example 12 (prepolymer (1)), a catalyst was not added, so that the resulting mixture was stirred and mixed under a temperature control of 80° C. and a nitrogen gas stream, thereby obtaining prepolymers (a) to (1).

The concentration of the isocyanate group of each of the prepolymers (a) to (1) was measured by controlling the temperature to 80° C. The results are shown in Table 1.

The isocyanate group content was obtained by a titration method with di-n-butylamine in conformity with the isocyanate group content ratio test described in JIS K 7301.

Description of Abbreviations in Table 1

1,4-BIC: 1,4-bis(isocyanatomethyl)cyclohexane produced in each of Production Examples 1,3-BIC: 1,3-bis(isocyanatomethyl)cyclohexane (trade name: TAKENATE600, manufactured by Mitsui Chemicals, Inc.)

MDI: diphenylmethane diisocyanate (trade name: COSMONATE PH, manufactured by Mitsui Chemicals & SKC Polyurethanes Inc.)

PLACCEL 230N: polycaprolactone diol (trade name: PLACCEL 230N, hydroxyl value: 37.4 mgKOH/g, number average molecular weight: 3000, manufactured by Daicel Corporation)

PTG3000SN: polytetramethylene ether glycol (trade name: PTG-3000SN, hydroxyl value: 37.5 mgKOH/g, number average molecular weight: 3000, manufactured by HODOGAYA CHEMICAL CO., LTD.)

TABLE 1

| | | | Synthesis Example No. | | | | |
|---|---|---|---|---|---|---|---|
| | | | Synthesis Ex. 1 | Synthesis Ex. 2 | Synthesis Ex. 3 | Synthesis Ex. 4 | Synthesis Ex. 5 |
| Isocyanate Group-terminated Polyurethane Prepolymer | | | a | b | c | d | e |
| Polyisocyanate | 1,4-BIC | (1) Trans 98% | | | | | |
| Component | | (3) Trans 94% | | | | | |
| (parts by mass) | | (4) Trans 86% | 19.5 | 19.5 | 19.7 | 66.9 | 97.0 |
| | | (5) Trans 73% | | | | | |
| | | (6) Trans 65% | | | | | |
| | 1,3-BIC | | | | | | |
| | MDI | | | | | | |
| First Polyol | PLACCEL230N | | 100.0 | | | 100.0 | 100.0 |
| Component | PTG3000SN | | | 100.0 | | | |
| (parts by mass) | PEG#4000 | | | | 100.0 | | |
| Isocyanate Group Content (mass %) | | | 4.65 | 4.63 | 4.75 | 15.60 | 19.79 |

| | | | Synthesis Example No. | | | | |
|---|---|---|---|---|---|---|---|
| | | | Synthesis Ex. 6 | Synthesis Ex. 7 | Synthesis Ex. 8 | Synthesis Ex. 9 | Synthesis Ex. 10 |
| Isocyanate Group-terminated Polyurethane Prepolymer | | | f | g | h | i | j |
| Polyisocyanate | 1,4-BIC | (1) Trans 98% | | | | | 66.9 |
| Component | | (3) Trans 94% | | | | 66.9 | |
| (parts by mass) | | (4) Trans 86% | | | | | |
| | | (5) Trans 73% | | | 19.5 | | |
| | | (6) Trans 65% | | 19.5 | | | |
| | 1,3-BIC | | 80.4 | | | | |
| | MDI | | | | | | |
| First Polyol | PLACCEL 230N | | 100.0 | 100.0 | 100.0 | 100.0 | 100.0 |
| Component | PTG3000SN | | | | | | |
| (parts by mass) | PEG#4000 | | | | | | |
| Isocyanate Group Content (mass %) | | | 17.69 | 4.64 | 4.66 | 15.58 | 15.59 |

| | | | Synthesis Example No. | | |
|---|---|---|---|---|---|
| | | | Synthesis Ex. 11 | Synthesis Ex. 12 | Synthesis Ex. 13 |
| Isocyanate Group-terminated Polyurethane Prepolymer | | | k | l | m |
| Polyisocyanate | 1,4-BIC | (1) Trans 98% | | | |
| Component | | (3) Trans 94% | | | |
| (parts by mass) | | (4) Trans 86% | 46.2 | | 33.7 |
| | | (5) Trans 73% | | | |
| | | (6) Trans 65% | | | |
| | 1,3-BIC | | | | |
| | MDI | | | 38.2 | |
| First Polyol | PLACCEL230N | | 100.0 | 100.0 | |
| Component | PTG3000SN | | | | 100.0 |
| (parts by mass) | PEG#4000 | | | | |
| Isocyanate Group Content (mass %) | | | 11.69 | 7.10 | 8.78 |

PEG #4000: polyethylene glycol (trade name: PEG #4000, hydroxyl value: 36.9 mgKOH/g, number average molecular weight: 3000, manufactured by NOF CORPORATION)

Production of Foaming Thermoplastic Polyurethane Resin

Examples 1 to 15 and 33, and Comparative Examples 1 to 5

The second polyol component (when the first polyol component was blended, the first polyol component and the second polyol component) was weighed in a stainless steel cup, so that in Examples 1 to 3, 5 to 15, and 33, and Comparative Examples 1 to 5 (foaming thermoplastic polyurethane resins (A) to (C) and (E) to (W)), the ratio (NCO group/OH group, NCO index) of the isocyanate group (NCO group) in the prepolymer with respect to the hydroxy group (OH group) in the second polyol component (when the first polyol component is blended, the first polyol component and the second polyol component) is 1.01, and in Example 4 (foaming thermoplastic polyurethane resin (D)), the ratio thereof is 1.03, and the temperature thereof was controlled to 80° C. With respect to the total amount of the prepolymer and the second polyol component (when the first polyol component is blended, the first polyol component and the second polyol component), 0.3 mass % of IRGANOX 245 (manufactured by BASF SE, heat resistant stabilizer), 0.25 mass % of TINUVIN 234 (manufactured by BASF SE, ultraviolet absorber), and 0.15 mass % of ADEKASTAB LA-72 (manufactured by ADEKA CORPORATION, light resistant stabilizer (HALS)) were added into the prepolymer whose temperature was controlled to 80° C. in a stainless steel vessel to be stirred and mixed for about 3 minutes by using a high-speed disper under stirring of 500 to 1500 rpm. Next, the second polyol component (when the first polyol component was blended, the first polyol component and the second polyol component) whose temperature was controlled to 80° C. was blended to be stirred and mixed for about 10 minutes by using a high-speed disper under stirring of 500 to 1500 rpm.

Next, a reaction liquid mixture was poured into a Teflon-made vat whose temperature was controlled to 120° C. in advance to react at 120° C. for 24 hours, so that primary products (A) to (O) and (R) to (W) were obtained.

Thereafter, each of the primary products (A) to (O) and (R) to (W) was removed from the Teflon-made vat to be cut into cubes with a bale cutter and pulverized into a pulverized pellet with a pulverizing machine. The pulverized pellet was left to stand at the heat treatment temperature for a heat treatment period described in Tables 2 to 6 to be dried at 80° C. for a whole day and night under a nitrogen gas stream. Thereafter, the strand was extruded in a range of 150 to 270° C. of the cylinder temperature with a single screw extruder (type: SZW40-28MGC manufactured by TECHNOVEL CORPORATION) to be cut, so that pellets of the foaming thermoplastic polyurethane resins (A) to (0) and (R) to (W) were obtained. The obtained pellets were further dried at 80° C. for a whole day and night under a nitrogen gas stream.

The type, the mass ratio, the heat treatment temperature, and the heat treatment period of the prepolymer and the second polyol component (when the first polyol component is blended, the first polyol component and the second polyol component) in Examples 1 to 15 and 33, and Comparative Examples 1 to 5 are shown in Tables 2 to 6.

Evaluation of Foaming Thermoplastic Polyurethane Resin

The obtained foaming thermoplastic polyurethane resins (A) to (0) and (R) to (W) were evaluated by the following evaluation method. The results are shown in Tables 2 to 6.

(Weight Average Molecular Weight Measurement of Foaming Thermoplastic Polyurethane Resin with Gel Permeation Chromatography (GPC))

In a conical flask, 50 mg (sample) of foaming thermoplastic polyurethane was immersed in 10 mL of N-methylpyrrolidone, and the temperature was controlled to 100° C. to be stirred by using a stirrer until the sample was dissolved. Thereafter, the solution was cooled until a room temperature to be then filtrated by using a filtration filter of 0.45 μm. Then, the filtrate was subjected to GPC measurement under the following analysis conditions. Then, in the peak of the chromatogram, the ratio of the area corresponding to the high molecular weight component having a weight average molecular weight of 400,000 or more to the total area of the peak was calculated from the measured chromatogram. The chromatogram obtained by the GPC measurement of Example 2 and Comparative Example 1 is shown in FIG. 1.

Device: TOSOH HLC-8220GPC

Column: Shodex KF-805L×2 pieces+KF-G4 A (guard column)

Column temperature: 40° C.

Eluent: N-methylpyrrolidone (containing 50 mM of lithium bromide)

Flow: 0.7 mL/min

Sample concentration: 0.5 wt %

Injection amount: 100 μL

Detector: RI detector (differential refractometer)

Molecular weight marker: polystyrene (TSK gel standard polystyrene)

(Hard Segment Concentration of Foaming Thermoplastic Polyurethane Resin)

The hard segment (hard segment formed by reaction of the polyisocyanate component with the second polyol component) concentration was calculated from the mixing ratio (charging) of each of the components by the following formula.

Formula: [mass (g) of second polyol component+(mass (g) of second polyol component/average molecular weight (g/mol) of second polyol component)×average molecular weight (g/mol) of polyisocyanate component]÷(mass (g) of first polyol component+polyisocyanate component (g)+mass (g) of second polyol component)×100

(Measurement of Aggregation Temperature of Foaming Thermoplastic Polyurethane Resin with Differential Scanning Calorimeter (DSC))

The measurement was performed by using a differential scanning calorimeter (manufactured by SII NanoTechnology Inc., trade name: EXSTAR6000 PC Station and DSC220C). About 8 mg of foaming thermoplastic polyurethane was thinly cut so as to have a shape capable of being tightly in contact with an aluminum-made pan to be collected thereon. The aluminum-made pan was covered with a cover to be crimped, thereby obtaining a measurement sample (sample). The alumina was collected in the same manner to be defined as a reference sample. The sample and the reference were set in a predetermined position in the cell; thereafter, the sample was cooled until −100° C. at a rate of 10° C./min under a nitrogen gas stream of flow of 40 NmL/min to be retained at the same temperature for 5 minutes; and next, the temperature thereof was increased to 270° C. at a rate of 10° C./min. Furthermore, after the sample was retained at 270° C. for 5 minutes, it was cooled until −70° C. at a rate of 10° C./min. The temperature of the exothermic peak appeared during this cooling was defined as the aggregation temperature of the foaming thermoplastic polyurethane resin.

(Measurement of Hardness of Foaming Thermoplastic Polyurethane Resin)

The pellet of each of the foaming thermoplastic polyurethane resins obtained in Examples 1 to 15 and 33, and Comparative Examples 1 to 5 was injection molded into a sheet shape by using an injection molding machine (type: NEX-140, manufactured by NISSEI PLASTIC INDUSTRIAL CO., LTD.) at setting of a screw rotation number of 80 rpm and a barrel temperature of 150 to 270° C. under the conditions of a metal mold temperature of 20° C., an injection time of 10 seconds, an injection rate of 60 mm/s, and a cooling time of 20 to 60 seconds. After an obtained sheet having a thickness of 2 mm was subjected to anneal treatment for 3 days at an oven of 80° C., it was aged for 7 days under constant temperature and constant humidity conditions of a room temperature of 23° C. and the relative humidity of 55%, so that an elastomer sheet of each of the foaming thermoplastic polyurethane resins of Examples 1 to 15 and 33, and Comparative Examples 1 to 5 was obtained.

The hardness (ASKER A and ASKER D) of each of the obtained elastomer sheets was measured in conformity with “JIS K-7311 Test Method of Polyurethane Thermoplastic Elastomer” (1995).

Production of Polyurethane Foaming Molded Article

As described in the following, polyurethane foaming molded articles (A) to (W) were obtained from the foaming thermoplastic polyurethane resins of Examples 1 to 15 and 33, and Comparative Examples 1 to 5.

The melt viscosity and the outflow starting temperature (flow starting temperature) of the foaming thermoplastic polyurethane resin were measured as described in the following.

(Measurement of Melt Viscosity and Flow Starting Temperature)

The flow starting temperature was measured by using a Koka-type flow tester (manufactured by Shimadzu Corporation, type: Shimadzu flow tester CFT-500), the temperature lower than the flow starting temperature by 20° C. was defined as the measurement starting temperature, and the melt viscosity was measured at a load of 196N and the temperature rising rate of 2.5° C./min. As the foaming thermoplastic polyurethane resin used in the measurement, one that dried at 80° C. for a whole day and night under a nitrogen gas stream was used.

Examples 16 to 30 and 34, and Comparative Examples 6 to 10 (Molding by Extrusion Foaming Method using Supercritical Carbon Dioxide)

Polyurethane foaming molded articles (A) to (O) and (R) to (W) were molded from the foaming thermoplastic polyurethane resins (A) to (O) and (R) to (W) by an extrusion foaming method using the supercritical carbon dioxide.

To be specific, a single screw extruder having a diameter of 30 mm in a first step (manufactured by Sun Engineering Co., Ltd., backflow preventing-type supercritical carbon dioxide gas injection port was set at a position of L/D=32 and L/D=17.5) was connected to an extruder (manufactured by Sun Engineering Co., Ltd., L/D=42) having a diameter of 40 mm in a second step with a short tube (hereinafter, referred to as a connection) having a diameter of 10 mm, and a tandem extruder equipped with a circular die (lip diameter (diameter): 40 mm, gap between the lip and the core: 0.46 mm) at the front end portion of the extruder (second step) having a diameter of 40 mm was used.

The barrel temperature of the single screw extruder having a diameter of 30 mm in the first step was set at the temperature where the melt viscosity of the foaming thermoplastic polyurethane resin showed 1000 Pa-s, and the set temperature of the extruder having a diameter of 40 mm in the second step was set at the flow starting temperature of the foaming thermoplastic polyurethane resin.

After the foaming thermoplastic polyurethane resin dried for a whole day and night in the oven at 80° C. under a nitrogen gas stream was sufficiently melted by using a single screw extruder (screw rotation number: 30 rpm) having a diameter of 30 mm in the first step, the supercritical carbon dioxide obtained by increasing a pressure until 30 MPa from a liquefied carbon dioxide cylinder through a pressure boosting device (SCF-Get manufactured by JASCO Corporation) was suppled to the melted foaming thermoplastic polyurethane resin at a flow rate of 25 g/hour to be sufficiently kneaded and melted, so that a kneaded product was produced.

Subsequently, the kneaded product was sent through the connection into the extruder (screw rotation number: 4 μm) having a diameter of 40 mm in the second step, and when the state of the kneaded product (foaming body) discharged from the circular die was stable, the air was sent into the inside of a cylindrical foaming body to be cooled, so that the cylindrical foaming body having a thickness of 2 mm was obtained. The circumference of the foaming body was cut to be expanded in a discharged direction, so that polyurethane foaming molded articles (A) to (O) and (R) to (W) in a sheet shape having a thickness of 2 mm were obtained.

Example 31 (Molding by Injection Foaming Method Using Supercritical Carbon Dioxide)

A polyurethane foaming molded article (P) was molded from the foaming thermoplastic polyurethane resin (B) by the injection foaming method using the supercritical carbon dioxide.

To be specific, the foaming thermoplastic polyurethane resin (B) dried for a whole day and night in the oven at 80° C. under a nitrogen gas stream was charged into an injection molding machine (type: JSW MuCell 110H/J85AD, manufactured by The Japan Steel Works, LTD.) where the barrel temperature was set at the temperature in which the melt viscosity of the foaming thermoplastic polyurethane resin showed 1000 Pa·s, and the supercritical carbon dioxide obtained by increasing a pressure until 30 MPa through a pressure boosting device (SCF-Get manufactured by JASCO Corporation) at the time of measurement was sent into the foaming thermoplastic polyurethane resin at a ratio of 0.8 mass % to be kneaded.

After the injection was conducted in a metal mold set at 60° C. and having a thickness of 1.5 mm at an injection rate of 60 mm/min, a holding pressure of 50 MPa, and a holding time of 5 seconds, the metal mold core receded by 4.5 mm and after cooling for 60 seconds, a polyurethane foaming molded article (P) having a thickness of 6 mm was obtained by demolding.

Example 32 (Molding by Bead Foaming Method)

A polyurethane foaming body (Q) was molded from the foaming thermoplastic polyurethane resin (B) by a bead foaming method using the supercritical carbon dioxide.

To be specific, a single screw extruder having a diameter of 30 mm in a first step (manufactured by Sun Engineering Co., Ltd., backflow preventing-type supercritical carbon dioxide gas injection port was set at a position of L/D=32 and L/D=17.5) was connected to an extruder (manufactured by Sun Engineering Co., Ltd., L/D=42) having a diameter of 40 mm in a second step with the connection having a diameter of 10 mm, and a tandem extruder equipped with a dice of a singular hole (diameter of the hole: 1.5 mm) at the front end portion of the extruder (second step) having a diameter of 40 mm was used.

The barrel temperature of the single screw extruder having a diameter of 30 mm in the first step was set at the temperature where the melt viscosity of the foaming thermoplastic polyurethane resin showed 1000 Pa-s, and the set temperature of the extruder having a diameter of 40 mm in the second step was set at the flow starting temperature of the foaming thermoplastic polyurethane resin.

After the foaming thermoplastic polyurethane resin (B) dried for a whole day and night in the oven at 80° C. under a nitrogen gas stream was sufficiently melted by using a single screw extruder (screw rotation number: 30 rpm) having a diameter of 30 mm in the first step, the supercritical carbon dioxide obtained by increasing a pressure until 30 MPa from a liquefied carbon dioxide cylinder through a pressure boosting device (SCF-Get manufactured by JASCO Corporation) was suppled to the melted foaming thermoplastic polyurethane resin at a flow rate of 25 g/hour to be sufficiently kneaded and melted, so that a kneaded product was produced.

Subsequently, the kneaded product was sent through the connection into the extruder (screw rotation number: 4 μm) having a diameter of 40 mm in the second step, and when the kneaded product (foaming body strand) discharged from the dice was cooled and the state of the foaming body strand was stable, the foaming body was cut into a piece having an appropriate size (about 2 mm in size), so that a foaming bead was obtained.

Thereafter, the foaming bead was charged into the metal mold, and the temperature thereof was controlled at a pressure of 1 MPa with vapor at 180° C. to be then cooled, so that a polyurethane foaming molded article (Q) having a thickness of 6 mm was obtained.

Evaluation of Polyurethane Foaming Molded Article

The obtained polyurethane foaming molded articles (A) to (W) were evaluated by the following evaluation method. The results are shown in Tables 2 to 6.

(Uniformity of Cell)

The uniformity of the cell of the obtained polyurethane foaming molded article was visually observed, and evaluations 5 to 1 were set as described in the following to be evaluated by 5 steps.

Evaluation 5: Most of the cells are minute, and the size of the cells is almost uniform.

Evaluation 4: Coarse cells are few, and the size of the cells is almost uniform.

Evaluation 3: Coarse cells are few, but the size of the cells is not uniform.

Evaluation 2: Coarse cells are many, and the size of the cells is not uniform.

Evaluation 1: Most of the cells are coarse, and the size of the cells is not uniform.

(Core Density (unit: $kg/m^3$))

A rectangular parallelepiped having a size of 10 cm×10 cm was cut from the obtained polyurethane foaming molded article, so that a measurement sample was produced.

Thereafter, the apparent density of the measurement sample was measured in conformity with JIS K 7222 (2005). This obtained result was evaluated as the core density (apparent core density) of the polyurethane foaming molded article.

(Hardness (ASKER C))

The obtained polyurethane foaming molded articles were stacked so as to have a thickness of 12 mm, and the C hardness thereof was measured in conformity with the hardness test (type C) of JIS K 7312 (1996).

(Rebound Resilience (Unit: %))

After a rectangular parallelepiped having a size of 10 cm×10 cm was cut from the obtained polyurethane foaming molded article, the rectangular parallelepipeds were stacked so as to have a thickness of 12 mm to obtain a measurement sample.

The rebound resilience of the measurement sample was measured in conformity with JIS K 6400-3 (2004).

(Compression Permanent Set (Unit: %))

After the obtained polyurethane foaming molded article was cut into piece in a columnar shape having a diameter of 29 mm, a measurement sample was produced so as to have a thickness of 12 mm.

Thereafter, the compression permanent set of the measurement sample was measured under the conditions of 23° C. and a compression of 25% in conformity with JIS K 6262.

(Breaking Strength (Unit: MPa))

A measurement sample was produced from the obtained polyurethane foaming molded article by using a JIS No. 1 dumbbell, and thereafter, the breaking strength of the measurement sample was measured in conformity with JIS K 6400-5 (2012).

(Tear Strength (Unit: kN/m))

A measurement sample was produced from the obtained polyurethane foaming molded article by using a JIS B-type dumbbell, and thereafter, the tear strength of the measurement sample was measured in conformity with a B method of JIS K 6400-5 (2012).

(Initial Color Phase: b*. Resistance to Discoloration by Ultraviolet Light (UV): Δb)

A rectangular parallelepiped having a size of 30 mm×40 mm was cut from the polyurethane foaming molded article, so that a measurement sample was produced. The yellowness b* thereof was measured by using a color difference meter (manufactured by Tokyo Denshoku Co., Ltd., Color Ace Model TC-1), b* is generally defined as a reference of the color phase of polyurethane.

Thereafter, an ultraviolet light of a short wavelength (wavelength of 270 to 720 mm) was applied to the measurement sample for 24 hours by using a QUV weathering tester equipped with an ultraviolet fluorescent (manufactured by Suga Test Instruments Co., Ltd., ultraviolet fluorescent weather meter FUV).

Δb (amount of change of b value) of the polyurethane foaming molded article before and after the application of ultraviolet light was measured by using the color difference meter (manufactured by Tokyo Denshoku Co., Ltd., Color Ace Model TC-1). Δb is generally defined as a reference of the resistance to discoloration by UV of the foaming molded article.

TABLE 2

| | | Example No. | | | | |
|---|---|---|---|---|---|---|
| | | Ex. 1 | Ex. 2 | Ex. 3 | Ex. 4 | Ex. 5 |
| Foaming Thermoplastic Polyurethane Resin | | A | B | C | D | E |
| Type of Prepolymer | | a | a | b | c | a |
| Second Polyol Component (parts by mass to 100 parts by mass of Prepolymer) | 1,4-BD | 4.9 | 4.9 | 4.9 | 4.9 | 4.9 |
| First Polyol Component (parts by mass to 100 parts by mass of Prepolymer) | PLACCEL 230N | | | | | |
| Hard Segment Concentration (mass %) | | 15 | 15 | 15 | 15 | 15 |
| Heat Treatment Temperature (° C.) | | 80 | 80 | 80 | 80 | 80 |
| Heat Treatment Period (day) | | 4 | 7 | 7 | 7 | 10 |
| Area Ratio (%) of Area of High Molecular Weight Component Having Weight Average Molecular Weight of 400,000 or more to Total Area of Peak in Chromatogram | | 29 | 45 | 47 | 44 | 57 |
| Aggregation Temperature (° C.) | | 133 | 135 | 140 | 141 | 135 |
| Hardness of Foaming Thermoplastic Polyurethane Resin | | 81A | 81A | 81A | 82A | 81A |

| | | Example No. | | | | |
|---|---|---|---|---|---|---|
| | | Ex. 16 | Ex. 17 | Ex. 18 | Ex. 19 | Ex. 20 |
| Polyurethane Foaming Molded Article | | A | B | C | D | E |
| Molding Method of Polyurethane Foaming Molded Article | | Extrusion Foaming | Extrusion Foaming | Extrusion Foaming | Extrusion Foaming | Extrusion Foaming |
| Evaluation | Uniformity of Cell | 4 | 5 | 5 | 5 | 4 |
| | Core Density (g/cm$^3$) | 0.27 | 0.25 | 0.24 | 0.24 | 0.28 |
| | Hardness (ASKER C) | 42C | 40C | 36C | 38C | 43C |
| | Rebound Resilience (%) | 72 | 74 | 78 | 76 | 71 |
| | Compression Permanent Set (%) | 13 | 9 | 10 | 10 | 12 |
| | Breaking Strength (MPa) | 2.1 | 2.5 | 2.4 | 2.3 | 2.2 |
| | Tear Strength (kN/m) | 9.8 | 11.3 | 10.4 | 10.7 | 9.5 |
| | Initial Color Phase (b*) | 1.4 | 1.5 | 1.7 | 1.8 | 1.9 |
| | Resistance to Discoloration by Ultraviolet Light (Δb) | 1.7 | 1.9 | 2.1 | 2.0 | 2.7 |

TABLE 3

| | | Example No. | | | | |
|---|---|---|---|---|---|---|
| | | Ex. 6 | Ex. 7 | Ex. 8 | Ex. 9 | Ex. 10 |
| Foaming Thermoplastic Polyurethane Resin | | F | G | H | I | J |
| Type of Prepolymer | | a | a | d | e | f |
| Second Polyol Component (parts by mass to 100 parts by mass of Prepolymer) | 1,4-BD | 1.9 | 2.8 | 16.6 | 21.0 | 18.8 |
| First Polyol Component (parts by mass to 100 parts by mass of Prepolymer) | PLACCEL 230N | 101.4 | 72.9 | | | |
| Hard Segment Concentration (mass %) | | 3 | 5 | 45 | 55 | 50 |
| Heat Treatment Temperature (° C.) | | 80 | 80 | 80 | 80 | 80 |
| Heat Treatment Period (day) | | 7 | 7 | 7 | 7 | 7 |
| Area Ratio (%) of Area of High Molecular Weight Component Having Weight Average Molecular Weight of 400,000 or more to Total Area of Peak in Chromatogram | | 47 | 46 | 40 | 39 | 39 |
| Aggregation Temperature (° C.) | | 83 | 98 | 175 | 186 | No Detection |
| Hardness of Foaming Thermoplastic Polyurethane Resin | | 68A | 72A | 50D | 60D | 80A |

| | | Example No. | | | | |
|---|---|---|---|---|---|---|
| | | Ex. 21 | Ex. 22 | Ex. 23 | Ex. 24 | Ex. 25 |
| Polyurethane Foaming Molded Article | | F | G | H | I | J |
| Molding Method of Polyurethane Foaming Molded Article | | Extrusion Foaming | Extrusion Foaming | Extrusion Foaming | Extrusion Foaming | Extrusion Foaming |
| Evaluation | Uniformity of Cell | 4 | 5 | 5 | 4 | 4 |
| | Core Density (g/cm$^3$) | 0.27 | 0.26 | 0.27 | 0.28 | 0.29 |
| | Hardness (ASKER C) | 29C | 31C | 51C | 60C | 39C |

TABLE 3-continued

| | | | | | | |
|---|---|---|---|---|---|---|
| | Rebound Resilience (%) | 75.0 | 79.0 | 69.0 | 61.0 | 53.0 |
| | Compression Permanent Set (%) | 11 | 6 | 11 | 14 | 17 |
| | Breaking Strength (MPa) | 1.5 | 2.0 | 3.8 | 3.0 | 1.3 |
| | Tear Strength (kN/m) | 6.8 | 8.4 | 15.5 | 12.9 | 7.1 |
| | Initial Color Phase (b*) | 1.3 | 1.4 | 1.7 | 1.8 | 2.1 |
| | Resistance to Discoloration by Ultraviolet Light (Δb) | 1.8 | 2.1 | 2.4 | 2.6 | 3.5 |

TABLE 4

| | | Example No. | | | | |
|---|---|---|---|---|---|---|
| | | Ex. 11 | Ex. 12 | Ex. 13 | Ex. 14 | Ex. 15 |
| Foaming Thermoplastic Polyurethane Resin | | K | L | M | N | O |
| Type of Prepolymer | | g | h | i | j | k |
| Second Polyol Component (parts by mass to 100 parts by mass of Prepolymer) | 1,4-BD | 4.9 | 4.9 | 16.5 | 16.6 | 12.4 |
| First Polyol Component (parts by mass to 100 parts by mass of Prepolymer) | PLACCEL 230N | | | | | |
| Hard Segment Concentration (mass %) | | 15 | 15 | 45 | 45 | 35 |
| Heat Treatment Temperature (° C.) | | 80 | 80 | 80 | 80 | 80 |
| Heat Treatment Period (day) | | 7 | 7 | 7 | 7 | 7 |
| Area Ratio (%) of Area of High Molecular Weight Component Having Weight Average Molecular Weight of 400,000 or more to Total Area of Peak in Chromatogram | | 40 | 42 | 45 | 44 | 47 |
| Aggregation Temperature (° C.) | | 78 | 94 | 178 | 184 | 167 |
| Hardness of Foaming Thermoplastic Polyurethane Resin | | 70A | 74A | 54D | 56D | 95A |

| | | Example No. | | | | |
|---|---|---|---|---|---|---|
| | | Ex. 26 | Ex. 27 | Ex. 28 | Ex. 29 | Ex. 30 |
| Polyurethane Foaming Molded Article | | K | L | M | N | O |
| Molding Method of Polyurethane Foaming Molded Article | | Extrusion Foaming | Extrusion Foaming | Extrusion Foaming | Extrusion Foaming | Extrusion Foaming |
| Evaluation | Uniformity of Cell | 4 | 5 | 5 | 4 | 5 |
| | Core Density ($g/cm^3$) | 0.29 | 0.27 | 0.27 | 0.28 | 0.25 |
| | Hardness (ASKER C) | 33C | 34C | 55C | 57C | 46C |
| | Rebound Resilience (%) | 62 | 70 | 68 | 63 | 71 |
| | Compression Permanent Set (%) | 12 | 7 | 12 | 15 | 11 |
| | Breaking Strength (MPa) | 1.8 | 2.2 | 4.0 | 3.5 | 3.3 |
| | Tear Strength (kN/m) | 8.6 | 9.8 | 15.8 | 13.5 | 14.4 |
| | Initial Color Phase (b*) | 1.7 | 1.6 | 1.6 | 1.8 | 1.5 |
| | Resistance to Discoloration by Ultraviolet Light (Δb) | 3.2 | 2.6 | 2.0 | 1.8 | 2.4 |

TABLE 5

| | | Example No. | | |
|---|---|---|---|---|
| | | — | — | Ex. 33 |
| Foaming Thermoplastic Polyurethane Resin | | B | B | W |
| Type of Prepolymer | | a | a | m |
| Second Polyol Component (parts by mass to 100 parts by mass of Prepolymer) | 1,4-BD | 4.9 | 4.9 | 9.3 |
| First Polyol Component (parts by mass to 100 parts by mass of Prepolymer) | PLACCEL 230N | | | |
| Hard Segment Concentration (mass %) | | 15 | 15 | 27 |
| Heat Treatment Temperature (° C.) | | 80 | 80 | 80 |
| Heat Treatment Period (day) | | 7 | 7 | 7 |
| Area Ratio (%) of Area of High Molecular Weight Component Having Weight Average Molecular Weight of 400,000 or more to Total Area of Peak in Chromatogram | | 45 | 45 | 48 |

TABLE 5-continued

| | | | | |
|---|---|---|---|---|
| Aggregation Temperature (° C.) | | 135 | 135 | 147 |
| Hardness of roaming Thermoplastic Polyurethane Resin | | 81A | 81A | 90A |

| | | Example No. | | |
|---|---|---|---|---|
| | | Ex. 31 | Ex. 32 | Ex. 34 |
| Polyurethane Foaming Molded Article | | P | Q | W |
| Molding Method of Polyurethane Foaming Molded Article | | Injection Foaming | Foaming Bead | Extrusion Foaming |
| Evaluation | Uniformity of Cell | 5 | 5 | 5 |
| | Core Density ($g/cm^3$) | 0.26 | 0.25 | 0.25 |
| | Hardness (ASKER C) | 39C | 40C | 42C |
| | Rebound Resilience (%) | 75 | 73 | 79 |
| | Compression Permanent Set (%) | 10 | 15 | 9 |
| | Breaking Strength (MPa) | 2.3 | 2.0 | 3.0 |
| | Tear Strength (kN/m) | 11.0 | 10.6 | 12.5 |
| | Initial Color Phase (b*) | 1.6 | 1.7 | 1.6 |

TABLE 5-continued

| | | | |
|---|---|---|---|
| Resistance to Discoloration by Ultraviolet Light (Δb) | 1.9 | 2.5 | 2.2 |

TABLE 6

| | | Example No. | | | | |
|---|---|---|---|---|---|---|
| | | Comp. Ex. 1 | Comp. Ex. 2 | Comp. Ex. 3 | Comp. Ex. 4 | Comp. Ex. 5 |
| Foaming Thermoplastic Polyurethane Resin | | R | S | T | U | V |
| Type of Prepolymer | | a | a | a | a | l |
| Second Polyol Component (parts by mass to 100 parts by mass of Prepolymer) | 1,4-BD | 4.9 | 4.9 | 4.9 | 4.9 | 7.5 |
| First Polyol Component (parts by mass to 100 parts by mass of Prepolymer) | PLACCEL 230N | | | | | |
| Hard Segment Concentration (mass %) | | 15 | 15 | 15 | 15 | 27 |
| Heat Treatment Temperature (° C.) | | 80 | 80 | 25 | 110 | 80 |
| Heat Treatment Period (day) | | 2 | 15 | 7 | 5 | 3 |
| Area Ratio (%) of Area of High Molecular Weight Component Having Weight Average Molecular Weight of 400,000 or more to Total Area of Peak in Chromatogram | | 23 | 63 | 19 | 67 | 35 |
| Aggregation Temperature (° C.) | | 125 | 133 | 123 | 124 | 81 |
| Hardness of Foaming Thermoplastic Polyurethane Resin | | 80A | 81A | 79A | 82A | 82A |

| | | Example No. | | | | |
|---|---|---|---|---|---|---|
| | | Comp. Ex. 6 | Comp. Ex. 7 | Comp. Ex. 8 | Comp. Ex. 9 | Comp. Ex. 10 |
| Polyurethane Foaming Molded Article | | R | S | T | U | V |
| Molding Method of Polyurethane Foaming Molded Article | | Extrusion Foaming | Extrusion Foaming | Extrusion Foaming | Extrusion Foaming | Extrusion Foaming |
| Evaluation | Uniformity of Cell | 2 | 2 | 1 | 2 | 3 |
| | Core Density ($g/cm^3$) | 0.29 | 0.31 | 0.29 | 0.28 | 0.26 |
| | Hardness (ASKER C) | 45C | 46C | 42C | 43C | 41C |
| | Rebound Resilience (%) | 58 | 63 | 59 | 71 | 53 |
| | Compression Permanent Set (%) | 25 | 24 | 26 | 24 | 27 |
| | Breaking Strength (MPa) | 1.4 | 1.6 | 1.2 | 1.6 | 1.5 |
| | Tear Strength (kN/m) | 6.9 | 7.4 | 6.2 | 7.7 | 8.4 |
| | Initial Color Phase (b*) | 1.5 | 4.5 | 1.4 | 5.8 | 9.5 |
| | Resistance to Discoloration by Ultraviolet Light (Δb) | 2.0 | 4.1 | 2.2 | 5.1 | 15.0 |

Description of Abbreviations in Tables 2 to 6

Prepolymer: isocyanate group-terminated polyurethane prepolymer 1,4-BD: 1,4-butanediol (manufactured by Mitsubishi Chemical Corporation)

PLACCEL 230N: polycaprolactone polyol (trade name: PLACCEL 230N, hydroxyl value: 37.4 mgKOH/g, number average molecular weight: 3000, manufactured by Daicel Corporation)

Uses of Polyurethane Foaming Molded Article

Reference Example 1

By using the foaming thermoplastic polyurethane resin (B), a polyurethane foaming molded article for a midsole having the density of 0.25 $g/cm^3$ was molded by injection foaming in the same manner as that of Example 31.

A test piece in a strip shape having a width of 10 mm and a length of 12 cm was stamped out from the foaming molded article, and Demattia Flex Cracking Test was repeatedly conducted under the conditions of 23° C. and a frequency of 5 Hz. As a result, there was no crack with a test of 150,000 times or more.

Reference Example 2

By using the foaming thermoplastic polyurethane resin (B), a polyurethane foaming molded article for a shock absorber having the density of 0.50 $g/cm^3$ was molded by injection foaming in the same manner as that of Example 31.

A test piece of the foaming molded article in a columnar shape having a diameter of 29 mm and a height of 30 mm was repeatedly subjected to a compression test at a compression rate of 75% under the conditions of 23° C. and a frequency of 0.22 Hz. As a result, there was no crack with a test of 2500 times or more.

Reference Example 3

By using the foaming thermoplastic polyurethane resin (B), a polyurethane foaming molded article for a chemical mechanical polishing (CMP) pad having the density of 0.30 $g/cm^3$ was molded by injection foaming in the same manner as that of Example 31.

The foaming molded article was stamped out in a circular shape (thickness of 3 mm) having a diameter of 50 mm to be immersed in butyl acetate and methyl ethyl ketone at 23° C. for 7 days, so that the volume change ratio ((V1 (volume after immersion)−V0 (volume before immersion))/V0×100 (%)) was calculated. The results were 55% and 70%, respectively.

Reference Example 4

By using the foaming thermoplastic polyurethane resin (B), a polyurethane foaming molded article for an automobile interior member having the density of 0.15 g/cm$^3$ was molded by injection foaming in the same manner as that of Example 31. The foaming molded article was stamped out in a circular shape (thickness of 3 mm) having a diameter of 50 mm to be immersed in oleate at 23° C. for 7 days, so that the volume change ratio ((V1 (volume after immersion)−V0 (volume before immersion))/V0×100(%)) was calculated. The result was 7%.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The foaming thermoplastic polyurethane resin, the producing method thereof, and the molded article of the present invention are preferably used as a midsole, a shock absorber, a chemical mechanical polishing (CMP) pad, sports articles, an automobile interior member, or the like.

The invention claimed is:

1. A foamable thermoplastic polyurethane resin which is:

a reaction product of a polyisocyanate component containing a bis(isocyanatomethyl)cyclohexane and a polyol component, wherein in a peak of a chromatogram obtained by measurement of the foamable thermoplastic polyurethane resin with gel permeation chromatography, the area of a high molecular weight component having a weight average molecular weight of 400,000 or more with respect to the total area of the peak is 29% to 60%.

2. The foamable thermoplastic polyurethane resin according to claim 1, wherein an aggregation temperature of the foamable thermoplastic polyurethane resin measured with a differential scanning calorimeter is 90° C. to 180° C.

3. The foamable thermoplastic polyurethane resin according to claim 1, wherein the bis(isocyanatomethyl)cyclohexane is a 1,4-bis(isocyanatomethyl)cyclohexane.

4. The foamable thermoplastic polyurethane resin according to claim 3, wherein the 1,4-bis(isocyanatomethyl)cyclohexane contains a trans-isomer at a ratio of 70 mol % to 96 mol %.

5. A method for producing a foamable thermoplastic polyurethane resin comprising:

a reaction step of obtaining a primary product by allowing a polyisocyanate component containing a bis(isocyanatomethyl)cyclohexane to react with a polyol component and a heat treatment step of, after the reaction step, heat treating the primary product at 50° C. to 100° C. for 4 days to 10 days.

6. A molded article comprising:

the foamable thermoplastic polyurethane resin according to claim 1.

7. The molded article according to claim 6, wherein the molded article is a midsole.

8. The molded article according to claim 6, wherein the molded article functions as a shock absorber.

9. The molded article according to claim 6, wherein the molded article is a chemical mechanical polishing pad.

10. The molded article according to claim 6, wherein the molded article is an automobile interior part.

* * * * *